United States Patent
Winn (10) Patent No.: US 10,341,422 B1
(45) Date of Patent: Jul. 2, 2019

(54) ENTITY PAIRING FOR A MULTI-USER CAX ENVIRONMENT

(71) Applicant: United Technologies Corporation, Hartford, CT (US)

(72) Inventor: Joshua Daniel Winn, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 321 days.

(21) Appl. No.: 14/748,269

(22) Filed: Jun. 24, 2015

(51) Int. Cl.
  *G06F 16/23* (2019.01)
  *G06F 17/50* (2006.01)
  *H04L 29/06* (2006.01)
  *H04L 29/08* (2006.01)

(52) U.S. Cl.
  CPC .......... *H04L 67/10* (2013.01); *G06F 16/2308* (2019.01); *G06F 17/50* (2013.01); *H04L 67/42* (2013.01)

(58) Field of Classification Search
  CPC ... H04L 67/10; H04L 67/42; G06F 17/30348; G06F 17/50; G06F 17/5086; G06F 16/2308
  See application file for complete search history.

(56) References Cited

U.S. PATENT DOCUMENTS

| | | | |
|---|---|---|---|
| 8,229,715 B1 | 7/2012 | Teller et al. | |
| 8,566,066 B2 | 10/2013 | Thompson et al. | |
| 2012/0109591 A1* | 5/2012 | Thompson | G06F 17/50 703/1 |
| 2013/0144566 A1* | 6/2013 | De Biswas | G06T 17/005 703/1 |
| 2013/0239011 A1* | 9/2013 | Red | G06T 5/00 715/743 |
| 2014/0222387 A1* | 8/2014 | Cannon | G06F 17/5018 703/1 |
| 2014/0222919 A1* | 8/2014 | Nysetvold | H04L 65/403 709/204 |

FOREIGN PATENT DOCUMENTS

WO 2014165628 10/2014

OTHER PUBLICATIONS

Edward Red, NXConnect: Multi-User CAx on a Commercial Engineering Software Application, Jul. 21, 2010, 2010 PACE Global Annual Forum.*

(Continued)

*Primary Examiner* — Wing F Chan
*Assistant Examiner* — Billy H Ng
(74) *Attorney, Agent, or Firm* — Carlson, Gaskey & Olds, P.C.

(57) ABSTRACT

A system for collaborating on a component according to an example of the present disclosure includes, among other things, a computing device configured to execute a first multi-user CAx environment including a synchronization module. The synchronization module is configured to cause a first entity of a component design to update in the first multi-user CAx environment according to at least one pairing criterion. The at least one pairing criterion relates to a second entity of the component design. A method for collaborating on a component design is also disclosed.

22 Claims, 5 Drawing Sheets

(56) References Cited

OTHER PUBLICATIONS

Edward Red, Multi-User Computer-Aided Design and Engineering Software Applications, Jan. 1, 2014, Springer International Publishing, p. 25-62.*
Red, E. (2010). NIXConnect: Multi-User CAx on a Commercial Engineering Software Application. 2010 Pace Global Annual Forum. 2010, pp. 1-9. Department of Mechanical Engineering, BYU.
Red, E. (2014). Cloud-Based Design and Manufacturing (CBDM). Jan. 1, 2014, pp. 25-62. Springer International Publishing.
Xu, Y. (2010). A Flexible Context Architecture for a Multio-User GUI. Dec. 2010. Department of Mechanical Engineering, Brigham Young University.

* cited by examiner

ENTITY PAIRING FOR A MULTI-USER CAX ENVIRONMENT

BACKGROUND

This disclosure relates to computer-aided technologies (CAx), and more particularly, to collaborating on a component in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a first multi-user CAx environment including a synchronization module. The synchronization module is configured to cause a first entity of a component design to update in the first multi-user CAx environment according to at least one pairing criterion. The at least one pairing criterion relates to a second entity of the component design.

In a further embodiment of any of the forgoing embodiments, the first entity and the second entity are generated in response to execution of one or more commands corresponding to a group of feature types.

In a further embodiment of any of the forgoing embodiments, the at least one pairing criterion relates to geometry of at least one of the first entity and the second entity.

In a further embodiment of any of the forgoing embodiments, the at least one pairing criterion includes at least one of a size, a location, and an orientation of the first entity relative to the second entity.

In a further embodiment of any of the forgoing embodiments, the first multi-user CAx environment includes a data module and a display module, the data module being configured to access data relating to the component design from at least one database and configured to store a local copy of the component design in the first multi-user CAx environment, and the display module being configured to display the component design in the first multi-user CAx environment according to the local copy.

In a further embodiment of any of the forgoing embodiments, the display module is configured to set the at least one pairing criterion in response to a user interaction.

In a further embodiment of any of the forgoing embodiments, the user interaction includes selection of geometry of the first entity and selection of geometry of the second entity.

In a further embodiment of any of the forgoing embodiments, the synchronization module is configured to cause the display module to display at least one visual indicator relating to the at least one pairing criterion.

In a further embodiment of any of the forgoing embodiments, the at least one visual indicator relates to a geometry of at least one of the first entity and the second entity.

In a further embodiment of any of the forgoing embodiments, the first entity and the second entity correspond to a single part file.

In a further embodiment of any of the forgoing embodiments, the data relating to the first entity is updated when at least one predetermined condition is met.

In a further embodiment of any of the forgoing embodiments, the at least one predetermined condition is a user interaction in the first multi-user CAx environment.

A system for collaborating on a component according to an example of the present disclosure includes at least one client multi-user CAx environment including a data module and a display module. The data module is configured to store a local copy of data corresponding to a component design from at least one database. The display module is configured to display data corresponding to the local copy. A host server includes a processor and a memory storage device. The processor is configured to execute a host multi-user CAx environment having a synchronization module. The memory storage device is configured to store the at least one database accessible by the host multi-user CAx environment, and the synchronization module is configured to selectively cause data relating to a first entity of the component design to update in the at least one database according to at least one pairing criterion, the at least one pairing criterion relating to a second entity of the component design.

In a further embodiment of any of the forgoing embodiments, the at least one pairing criterion includes one or more parameters of the first entity linked to one or more parameters of the second entity.

In a further embodiment of any of the forgoing embodiments, the at least one pairing criterion includes at least one of a size, a location, and an orientation of the first entity relative to the second entity.

A method for collaborating on a component design according to an example of the present disclosure includes the steps of accessing a component design in a first multi-user CAx environment from at least one database, selecting a first entity of the component design, setting at least one pairing criterion relating to the first entity and relating to a second entity of the component design, and updating the first entity according to the at least one pairing criterion in response to one or more parameters of the second entity being set.

In a further embodiment of any of the forgoing embodiments, creation of the first entity occurs prior to creation of the second entity.

A further embodiment of any of the foregoing embodiments includes displaying the first entity in the first multi-user CAx environment according to the at least one pairing criterion when at least one predetermined criterion is met.

In a further embodiment of any of the forgoing embodiments, the step of setting the at least one pairing criterion relating to the first entity and the second entity includes selection of geometry of the first entity and selection of geometry of the second entity.

In a further embodiment of any of the forgoing embodiments, the step of updating the first entity according to the at least one pairing criterion in response to one or more parameters of the second entity being set includes causing a position of the first entity to change.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed embodiments will become apparent to those skilled in the art from the following detailed description. The drawings that accompany the detailed description can be briefly described as follows.

DETAILED DESCRIPTION

Figure 1:
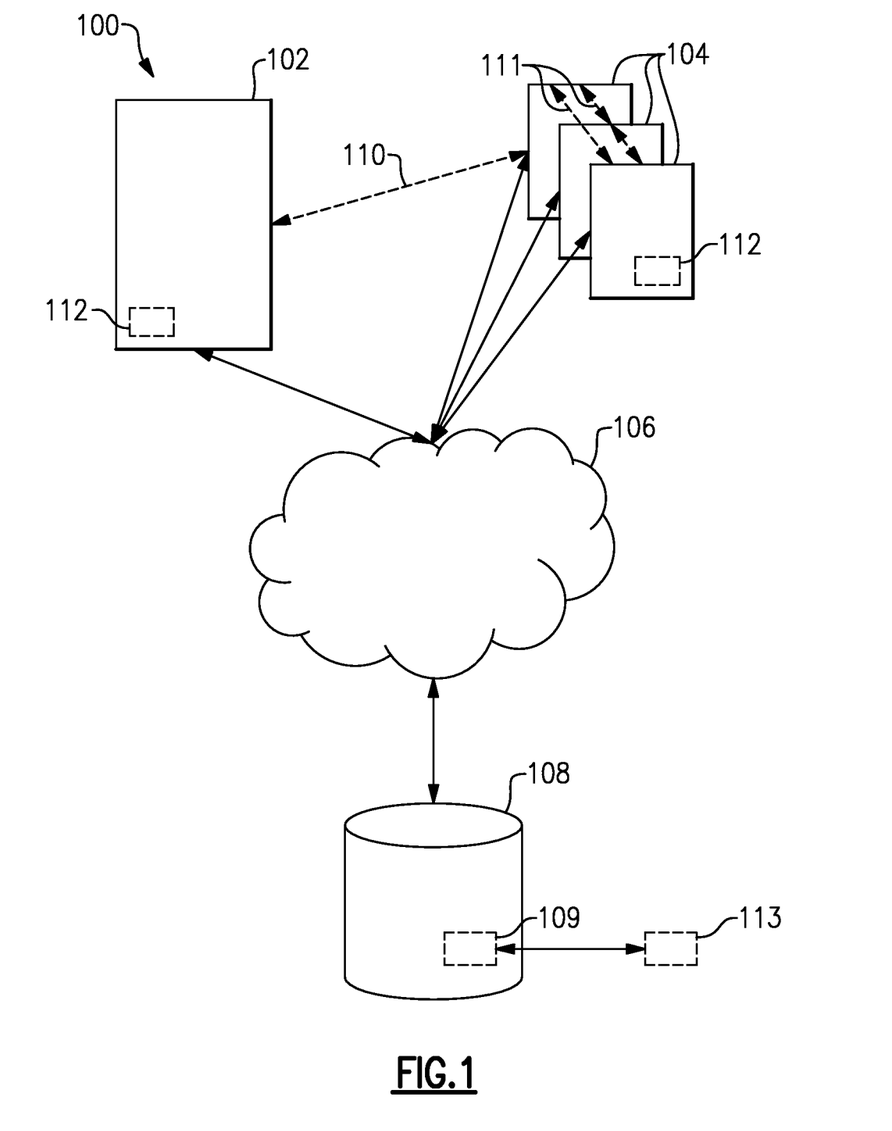
FIG. 1 illustrates a system for a multi-user CAx environment, according to an embodiment.

FIG. 1 illustrates an example computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files 113, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file 113 in the database 109 is associated with a component design, sub-assembly and/or assembly. In other embodiments, each feature, feature type, part, component design, sub-assembly and/or assembly corresponds to a unique identifier or database entry. In some embodiments, the database 109 is linked or otherwise corresponds to multiple part files 113. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file 113 includes a part tree or another data structure to organize and associate the features in a parent-child relationship between different features and/or part files 113. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" refers to a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

The term "entity" refers to any aspect of a component design, including features, and geometric and non-geometric attributes and/or parameters.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types can be utilized including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

Multiple users each provided with a CAx environment 112 via the client computers 104 are able to simultaneously access a component design stored in the database 109 or in the part file 113 linked to the database 109, and are able to view and modify various aspects of a component design corresponding to one or more part files. In some embodiments, the part file 113 is stored locally at the storage system 108, with local copies of the part file at the client computers 104 being synchronized periodically. Modifications to each part file 113 are communicated to each CAx environment 112 currently accessing the part file 113, either in real-time or periodically utilizing a synchronization scheme. Display or visualization of the modification is therefore made substantially immediately available in CAx environments 112 accessing the same part file 113, which can assist the multiple users in reducing, identifying/or and resolving conflicts or inconsistencies in various aspects of a component design, thereby ensuring that a particular design intent is met.

Figure 2A:
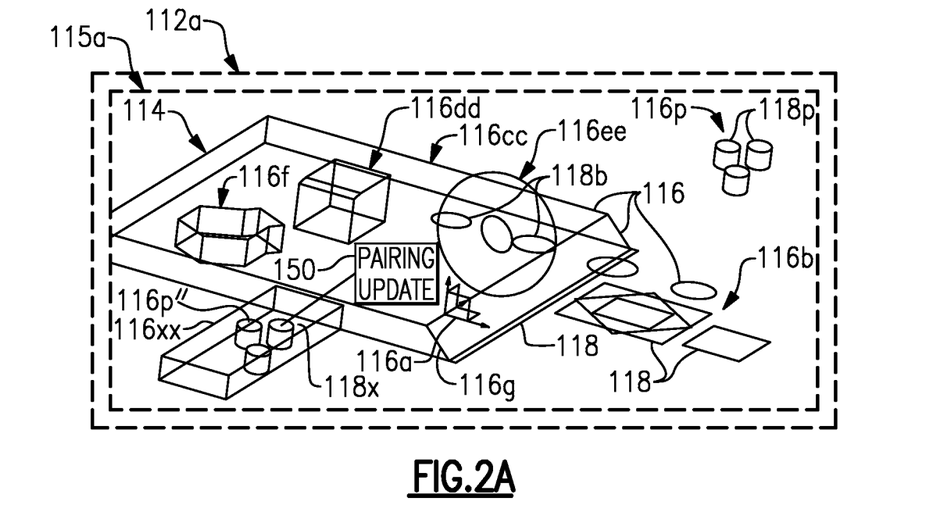
FIG. 2A illustrates a sample component design displayed in a first CAx environment, according to an embodiment.
Figure 2B:
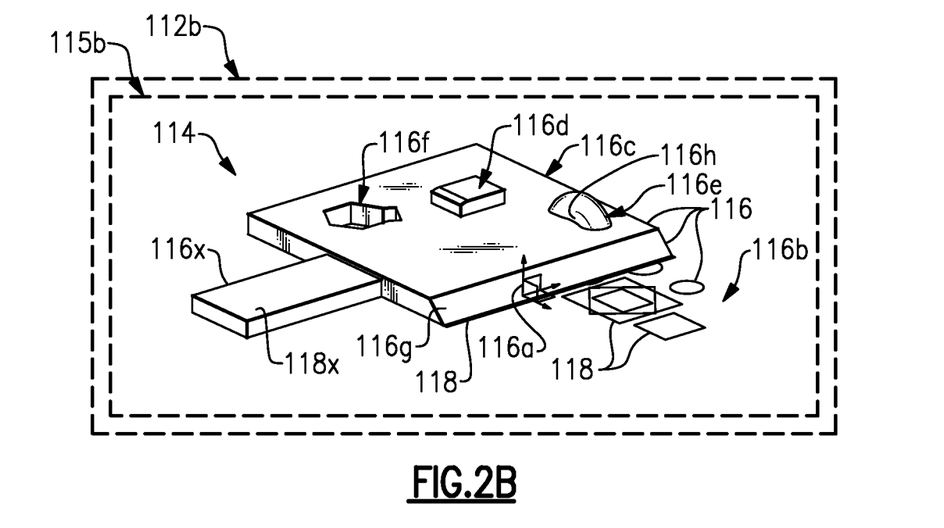
FIG. 2B illustrates the sample component design of FIG. 2A displayed in a second CAx environment, according to an embodiment.

FIGS. 2A-2B illustrate one embodiment in which two users collaborate on various aspects of a component model or design 114 having at least one feature 116. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example. In this scenario, the component design 114 is the active work part for each of the first and second CAx environments 112a, 112b such that each user is able to load, display and edit aspects of the component design 114.

The sample component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature. In some embodiments, the at least one feature 116 is generated in response to execution of at least one command provided by the CAx environment 112 and corresponds to a group of feature types. In other embodiments, the features 116 are stored in one or more databases 109 and/or part files 113 as data representing the geometry of the features 116.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" refers to data corresponding to one or more features, feature types, layers or other parameters which can be utilized to display a component model or design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b, according to an embodiment. As illustrated by the CAx environment 112a in FIG. 2A, the user has selected one or more visualization settings to show the wireframe geometries such as wireframe 116cc, 116dd, 116ee and to hide the corresponding solid features 116c, 116d, 116e. In the CAx environment 112b shown in FIG. 2B, the user has selected one or more visualization settings to show solid features such as solids 116c, 116d, 116e and to hide wireframes such as corresponding wireframes 116c, 116d, 116e, for example. The visualization settings of each CAx environment 112 can be customized according to the needs of a particular situation even though each of the users is working on the same component design 114.

In some embodiments, a first user with access to a CAx environment 112 desires to begin creating one or more features 116, geometry 118 or other entities of a component design 114 that the first user desires to relate to another feature or entity that has not been created or may require additional modification or definition. A second user, for example, may be responsible for creating geometry 118 that the first user desires the feature 116 to relate to. One example includes creating a bolt pattern on a flange that does not exist yet in a component design or is in the process of being created or defined at the time the bolt pattern is created. By utilizing the techniques disclosed herein, a user is able to pair two or more entities such that changes to one entity cause another one of the entities to update based on one or more pairing criteria, defining a desired relationship between the entities. The techniques disclosed herein reduce a likelihood of overwriting or other conflicts in the component design 114 during a collaborative process between two or more users.

Although the teachings herein primarily relate to pairing two features 116 or other entities relating to two different CAx environments 112, it should be appreciated that the techniques disclosed herein can be utilized for entities relating to a single CAx environment 112, such as pairing of geometry 118 of the same or different features 116. The techniques disclosed herein can be utilized for features 116 or other entities at same or different levels in a part tree, including base features and sub-features. The entities indicated in the pairing criteria 120 may correspond to a single component design 114, a single part file 113, a single database 110, multiple component designs 114 of an assembly or sub-assembly, multiple part files 113 and/or multiple databases 109 accessed from single user and/or multi-user CAx applications.

Figure 3A:
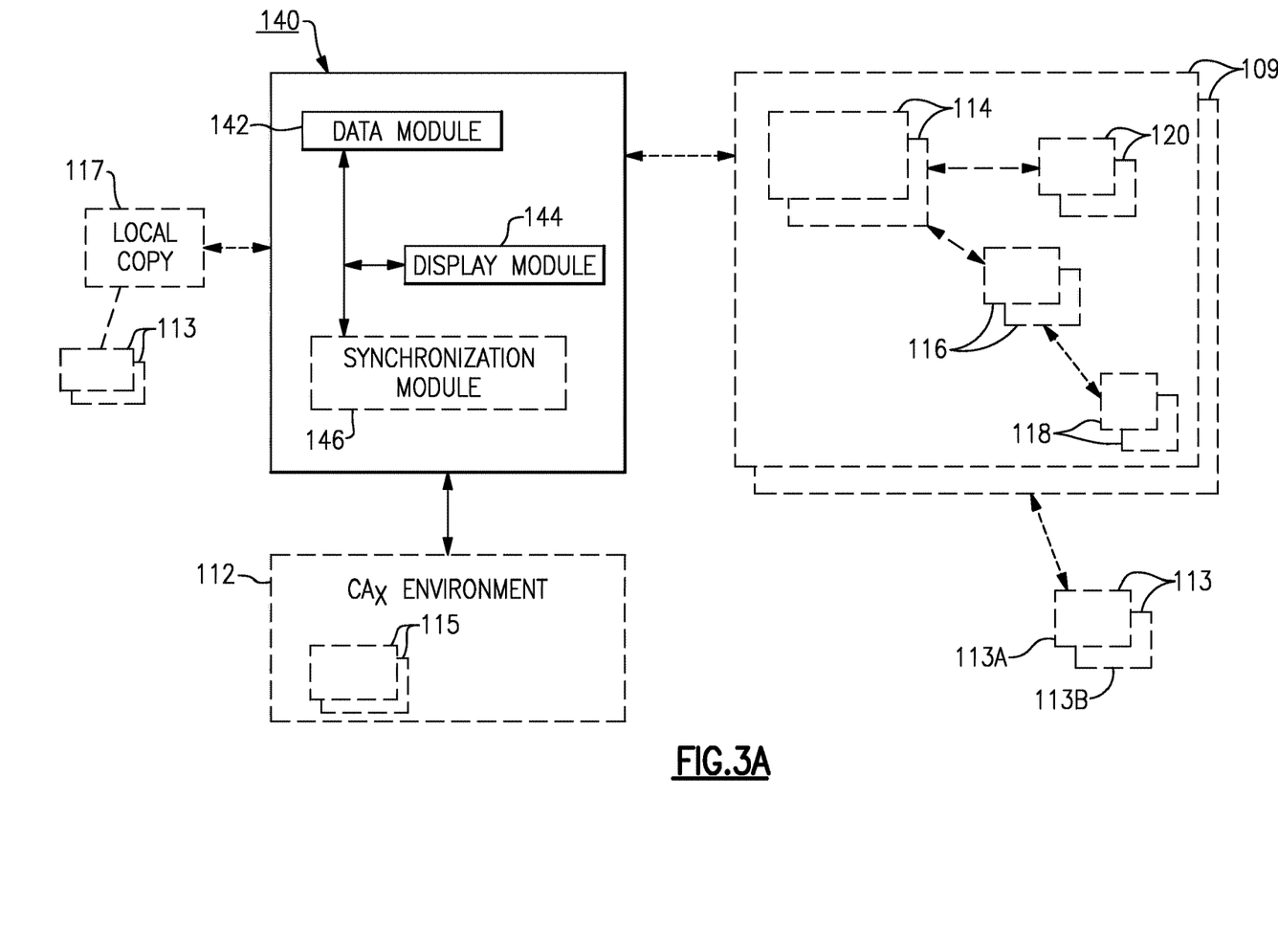
FIG. 3A illustrates a system for updating entities of a component design, according to an embodiment.

FIG. 3A illustrates an example CAx package 140 for updating a component design, such as the component design 114A shown in FIG. 2A, according to an embodiment. The CAx package 140 is configured to update one or more features, sub-features, geometry, attributes or other entities of a component design 114 according to one or more pairing criteria 120 and in response to creation or modification(s) made to one or more other entities indicated in the pairing criteria 120, including changes made to the component design 114 by another CAx environment 112.

In some embodiments, the CAx package 140 is provided as a portion of a CAx software tool integrated into or with a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more component designs 114. Each of these modules includes executable software instructions and/or digital or analog hardware circuitry.

The CAx package 140 includes a data module 142 configured to access, retrieve and/or store data corresponding to one or more component designs 114. In some embodiments, the data is stored in one or more databases 109 as one or more tables, records or entries. In other embodiments, the data is stored in one or more part files 113 and is accessible by referencing one or more objects or memory locations referenced by the one or more records or entries. Each part file 113 or record includes data corresponding to at least one feature 116, such as any of the feature types discussed in this disclosure.

In one embodiment, the data module 142 is configured to create a local copy 117 of the data, which is updated or synchronized with modifications to various aspects of the component design 114 utilizing various techniques. The local copy 117 can be linked to one or more part files 113 which can be accessed locally from the CAx environment 114.

In another embodiment, the data module 142 is configured to cache data such that accessing the database 109 does not cause data corresponding to additions or changes to the component design(s) 114 and/or corresponding feature(s) 116 in the local copy 117 to update unless at least one predefined condition is met, such as a checkpoint set for the corresponding component model(s) 114. Utilizing a caching technique, the component design 114 is displayed in the CAx environment 112 based on the state of the data at the time the data was last accessed in the database 109. In this state, data corresponding to the component design 114 in the database 109 may be different from data stored in the local copy 117 in the CAx environment 112. This technique of locally storing or caching data reduces data transfer requirements between the CAx environment 112 and the database 109 and improves system resource utilization.

In some embodiments, the CAx package 140 includes a display module 144. The display module 144 is configured to display data corresponding to one or more component models 114 and/or one or more features 116 in a CAx environment 112, such as in one of the CAx environments 112a, 112b. In one embodiment, the display module 144 is configured to display data according to the local copy 117. In some embodiments, the display module 144 is configured to display data corresponding to changes to entities in the component design 114 in response to changes to one or more entities indicated in the pairing criteria 120, including changes made to at least one feature 116 caused by another CAx environment 112 such as the second CAx environment 112b (FIG. 2B).

In some embodiments, the data module 142 interfaces or otherwise communicates with a synchronization module 146 to provide the desired solution. The synchronization module 146 is configured to selectively cause data relating to one or more entities to update in the local copy 117 and/or in the database 109 according to the one or more pairing criteria 120. The synchronization module 146 is configured to cause the one or more entities to update according to the pairing criteria 120 when the modification(s) to the component design 114 relate to at least one of the entities indicated in the pairing criteria 120.

In some embodiments, the host computer 102 provides the synchronization module 146 as one or more software services. In another embodiment, each of the client computers 104 is operable to execute an instance of the synchronization module 146. In one embodiment, a single computing platform such as the host computer 102 or one of the client computers 104 is configured to execute the data module 142 and/or the synchronization module 146.

The one or more pairing criteria 120 include parameter(s) relating to two or more entities of the component design 114, such as two or more features 116 or geometry 118. Example pairing criteria 120 include a unique identifier or name for each of the relevant features 116 or entities. Other example pairing criteria 120 include parameter(s) of one of the entities linked to parameter(s) of another one of the entities to define a desired relationship between the entities, such as relative sizes, locations, and/or orientations of two or more features 116, or related geometry 118 of the respective features 116.

Various techniques for storing the pairing criteria 120 can be utilized. In one embodiment, the pairing criteria 120 are one or more parameters or attributes of at least one of the entities indicated in the pairing criteria 120. In another embodiment, the synchronization module 146 is configured to cause the data module 142 to store the pairing criteria 120 to a desired location, such as at one of the client computers 104 or in the database 109, and link the pairing criteria 120 to two or more entities of the component design 114. The synchronization module 146 can be configured to query the pairing criteria 120 when the component design 114 is updated in the database 109 or in the local copy 117. In some embodiments, the pairing criteria 120 is stored in, or linked to, parameter(s) or attribute(s) of each of the entities indicated in the pairing criteria 120.

The synchronization module 146 is configured to determine whether modification(s) to the component design 114 relate to at least one of the entities indicated in the pairing criteria 120. The synchronization module 146 is configured to identify one or more entities of the component design 114 having pairing criteria 120 specified. In some embodiments, the synchronization module 146 is configured to traverse a part tree of the component design 114 to determine when changes to the entities relate to the pairing criteria 120. The synchronization module 146 can be configured to periodically poll the database 109 for changes, or receive notifications communicated from another CAx environment 112 and/or the database 109, for example.

The synchronization module 146 is configured to cause the entity to update according to the pairing criteria 120 in situations where creation of the entity indicated in the pairing criteria 120 occurs prior to, concurrently with and/or after the creation or modification of another one of the entities indicated in the pairing criteria 120. This technique allows two or more users to collaborate concurrently on various aspects of a component design 114, even though the entities indicated in the pairing criteria 120 may be at different states in the design process.

In another embodiment, the features 116 or other entities relating to the pairing criteria 120 are timestamp independent relative to each other. The component design 114 may be updated periodically in the database 109 and/or the local copy 117. Each feature 116 of the component design 114 can have a timestamp. The timestamp may correspond to a checkpoint set in the environment 112 or in the local copy 117, set when the data was last updated in the CAx environment 112, for example. The data module 142 is configured to cause a particular feature 116 or other entity in the component design 114 to update when the corresponding timestamp meets a predetermined threshold.

Utilizing the techniques disclosed herein, creation or modification of one entity relating to the pairing criteria 120 does not cause an overwrite of another entity relating to the pairing criteria 120 to occur or otherwise cause a conflict in the component design 114, even though the entities may have different timestamps. Instead, the entity is updated according to the desired relationship between the entities indicated in the pairing criteria 120. In some example embodiments, the timestamps of the entities indicated in the pairing criteria 120 are set to equal each other once an update occurs.

In the illustrated embodiment of FIGS. 2A and 2B, a first user provided with the first CAx environment 112a desires to create a pattern 116p including a plurality of Booleans or holes 118p (FIG. 2A). A second user provided with the second CAx environment 112b desires to create an extrude 116x (FIG. 2B) corresponding to wireframe 116xx (FIG. 2A). The first user desires to begin creating the pattern 116p in the component design 114 prior to the second user creating or otherwise defining one or more parameters of the extrude 116x. The first user interacts with first CAx environment 112a to define pairing criteria 120 for the pattern 116p.

Figure 3B:
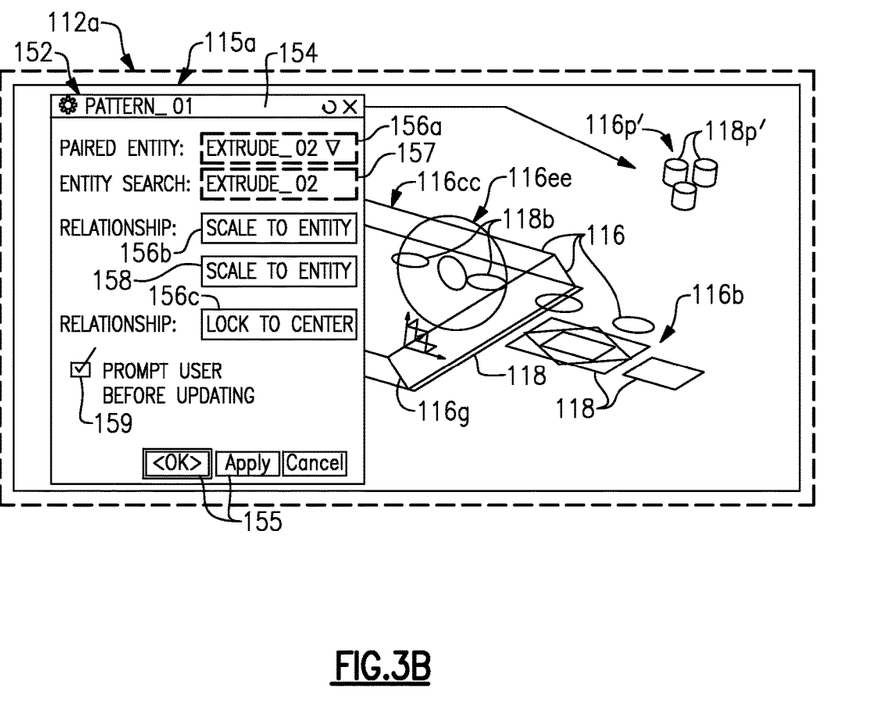
FIG. 3B illustrates a sample graphical user interface (GUI) for pairing entities, according to an embodiment.

FIG. 3B shows a sample interactive GUI 152 provided with an example CAx tool, such as CAx package 140, for allowing a user to set pairing criteria 120 in a CAx environment 112, according to an embodiment. In the illustrated embodiment of FIG. 3B, the first user provided with CAx environment 112a interacts with GUI 152 to set pairing criteria 120 for pattern 116p (FIG. 2A) indicated as "PATTERN_01" in title block 154. The display module 144 can be configured to display the GUI 152 in response to selection of a menu item, or in response to selection of the pattern 116p in the viewing frustum 115a, for example.

The first user is able to select or otherwise indicate a unique identifier or name of the extrude 116x in the GUI 152. In the illustrated embodiment of FIG. 3B, the user selects the unique identifier from a drop down list 156a (indicated as "EXTRUDE_02"), for example. In another embodiment, the first user is able to indicate a unique identifier or name in a text box 157 (shown in dashed line) to specify an entity that has not been created in the component design 114 at the time the pairing criteria 120 is set. Utilizing this technique, the synchronization module 146 causes the pattern 116p to attach to, or otherwise associates the pattern 116p with, extrude 116x once the extrude 116x is created or is otherwise available in the first CAx environment 112a.

The first user is able to specify a desired relationship between the pattern 116p and the extrude 116x. In the illustrated embodiment of FIG. 3B, the first user selects option(s) in one or more drop down lists such as list 156b (indicated as "SCALE TO ENTITY"). The first user may be prompted to set one or more values in field(s) for a selected relationship, such as a desired scale of the pattern 116p and the extrude 116x in field 158 (indicated as a scale of 1:2). The first user may also indicate whether the first user desires to be prompted before updates are made to the pattern 116p, such as by selecting a checkbox 159. The first user is able to apply the pairing criteria 120 to the pattern 116 by selection of one or more buttons 155, for example. Once the pairing criteria 120 are saved, the first user is able to modify one or more parameters of the pairing criteria 120 utilizing the techniques disclosed herein, including interacting with GUI 152.

The pattern 116p is resized to the desired scale, as illustrated by pattern 116p' and holes 118p' (FIG. 3B), when the second user creates the extrude 116x (FIG. 2B) and the component design 114 updates in the database 109 and/or the local copy 117, for example. Creation of extrude 116x, or setting parameter(s) of the extrude 116x causes the pattern 116p to scale to the extrude 116x according to the pairing criteria 120.

In some embodiments, a user is able to edit one or more of parameters of the pairing criteria 120 once the pairing criteria 120 are stored in a desired memory location such as in the database 109. For example, the first user provided with the first CAx environment 112a may desire to change a relative scale of the pattern 116p and the extrude 116x (e.g., from 1:2 to 1:3). The synchronization module 146 is configured to cause the pattern 116p to update according to changes to the pairing criteria 120.

The first user may desire to define a spatial relationship between the pattern 116p and the extrude 116x. The first user is able to interact with viewing frustum 115a to select geometry of the extrude 116x, such as face 118x. The synchronization module 146 causes the display module 144 to display the GUI 152 in the viewing frustum 115a. The first user is able to interact with the GUI 152 to specify a desired spatial relationship, such as locking a relative distance and orientation between the pattern 116p and the face 118x by selecting an option (i.e., "LOCK TO CENTER") in the list 156c. Once the first user applies the pairing criteria 120 by selection of one of the buttons 155, a spatial position and/or orientation of the pattern 116x is updated according to the pairing criteria 120. In the illustrated example of FIG. 2A, setting of the parameters in the GUI 152 causes the pattern 116x to change location to a center of the face 116' as depicted by pattern 116p". Related spatial changes made to face 116x may cause a corresponding change to the pattern 116p" according to the pairing criteria 120 (e.g., a change in location of a center of face 118x). In another embodiment, a user is able to lock a respective position of adjacent geometry 118 together, such as two edge faces positioned adjacent to each other.

In some embodiments, the synchronization module 146 is configured to cause the display module 144 to display changes to entities relating to the pairing criteria 120 when at least one predetermined condition is met. The at least one predetermined condition can be set or otherwise designated by a user provided with the functionality of the CAx package 140, either manually during execution of a CAx environment 112, such as by one or more GUIs, or at system configuration or run-time, for example.

Various predetermined conditions for selectively displaying changes to entities indicated in pairing criteria 120 are contemplated. In one embodiment, the predetermined condition is a user interaction in the CAx environment 112, such as a user interacting with a GUI or other notification requesting the user to accept the updates according to the pairing criteria 120. In another embodiment, the predetermined condition is a predetermined time threshold, such as an elapsed time since the data module 142 last accessed the database 109 and/or stored data in the local copy 117.

In some embodiments, the display module 144 is configured to display one or more visual indicators relating to parameter(s) of the pairing criteria 120. In one embodiment, the visual indicator is a label or other textual description 150 (FIG. 2A) displayed in the viewing frustum 115 when the changes relate to the pairing criteria 120. In another embodiment, the visual indicator relates to geometry 118 of the related feature(s) 116 modified in the database 109 and/or the local copy 117, such as surface coloring, transparency, shading or texturing, for example. The display module 144 can be configured to present a preview of update(s) to the feature 116 or affected entity as a visual indicator, prior to the user accepting the updates to the affected entity identified in the pairing criteria 120. Accordingly, the user is able to continue modifying one or more of the affected entities indicated in the pairing criteria 120 prior to the updates being stored in the local copy 117.

Figure 4:
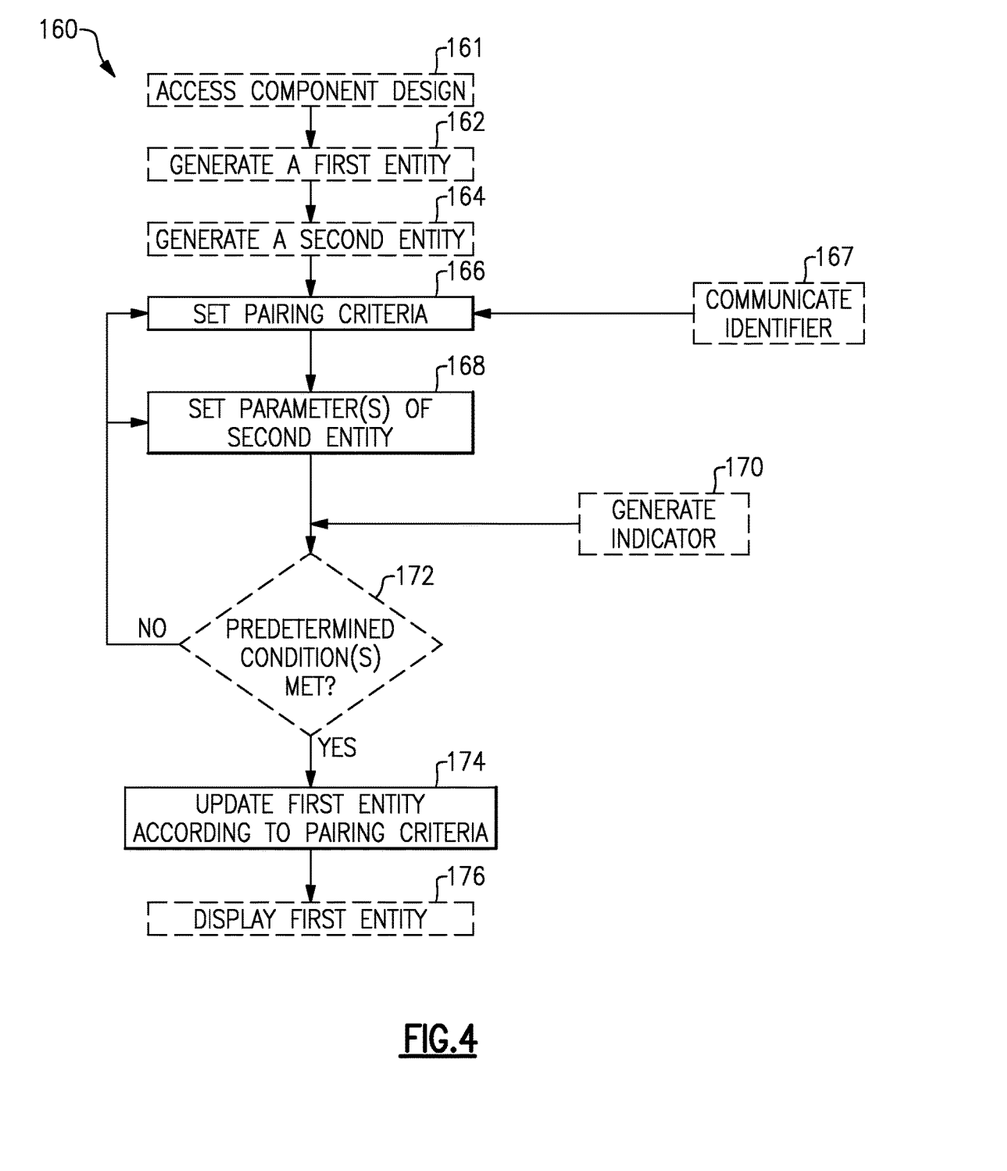
FIG. 4 illustrates an algorithm for pairing entities of a component design, according to an embodiment.

FIG. 4 illustrates an algorithm 160 in a flowchart for pairing entities of a component design, utilizing any of the techniques described in this disclosure and the CAx package 140 shown in FIGS. 3A and 3B. In some embodiments, the algorithm 160 is executed within a multi-user CAx environment, such as CAx environment 112a shown in FIG. 2A.

In some embodiments, a first CAx environment accesses data corresponding to a component design at block 161. A first entity of the component design is generated at block 162. The first entity can be generated in the first CAx environment, for example. A second entity of the component design is generated at block 164. The second entity can be generated in a second CAx environment, for example. At block 166 one or more pairing criteria are set, including any of the pairing criteria and utilizing any of the techniques disclosed herein.

In some embodiments, an identifier corresponding to the second entity is communicated to the first CAx environment at block 167, and is utilized to set the pairing criteria at block 166. The indicator can be communicated prior to, during, or subsequent to the second entity being generated at block 164.

At block 168 one or more parameters of the second entity are set in the second CAx environment. In some embodiments, one or more indicators relating to the pairing criteria 120 are generated and/or displayed in the first CAx environment at block 170, including any of the indicators disclosed herein.

The algorithm 160 determines whether one or more predetermined conditions are met at block 172. The predetermined conditions can include any of the conditions disclosed herein. The algorithm 160 causes one or more parameters of the first entity to update according to the one or more pairing criteria at block 174. In an embodiment, block 174 includes updating a local copy of the component design with data corresponding to the changes relating to the pairing criteria. The algorithm 160 causes the first CAx environment to display data relating to the updated parameter(s) of the first entity at block 176.

The algorithm 160 can be programmed in the CAx software directly, provided as one or more software plug-ins adapted to work with the native CAx software, or provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running a multi-user CAx environment 112 can be programmed with multiple additional tools, and the various features and tools included can be configured to interoperate with each other according to known principles.

Although the discussed embodiments illustrate a specific component, embodiments of this disclosure are not limited to those particular combinations. One skilled in the art having the benefit of this disclosure will recognize that it is possible to use some of the components or features from one of the embodiments in combination with features or components from another one of the embodiments. Furthermore, various embodiments may include one or more alternative sub-embodiments within them, while other embodiments may include a different subset of embodiments. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
    a computing device configured to execute a first multi-user computer-aided technologies (CAx) environment including a synchronization module;
    wherein the first multi-user computer-aided technologies (CAx) environment includes a data module configured to access data relating to a component design from at least one database and configured to store a local copy of the component design in the first multi-user computer-aided technologies (CAx) environment; and
    wherein the synchronization module is configured to cause a first entity in the component design to update in the first multi-user computer-aided technologies (CAx) environment according to at least one pairing criterion in response to a predetermined time threshold being met, the predetermined time threshold being an elapsed time since the data module last accessed data corresponding to the first entity in the at least one database and/or the local copy, the at least one pairing criterion relating to a second entity in the component design, wherein the first entity and the second entity are separate and distinct geometric features in a single instance of the component design, and the at least one pairing criteria is set prior to creation of the first entity.

2. The system as recited in claim 1, wherein the first entity and the second entity are generated in response to execution of one or more commands corresponding to a group of feature types.

3. The system as recited in claim 1, wherein the at least one pairing criterion relates to geometry of at least one of the first entity and the second entity.

4. The system as recited in claim 1, wherein the at least one pairing criterion includes at least one of a size, a location, and an orientation of the first entity relative to the second entity.

5. The system as recited in claim 1, wherein the first multi-user computer-aided technologies (CAx) environment includes a display module, the display module being configured to display the component design in the first multi-user computer-aided technologies (CAx) environment according to the local copy, and each of the first entity and the second entity is a geometric feature in the local copy of the component design.

6. The system as recited in claim 5, wherein the display module is configured to set the at least one pairing criterion in response to a user interaction.

7. The system as recited in claim 6, wherein the user interaction includes selection of geometry of the first entity and selection of geometry of the second entity.

8. The system as recited in claim 6, wherein the synchronization module is configured to cause the display module to display at least one visual indicator relating to the at least one pairing criterion.

9. The system as recited in claim 8, wherein the at least one visual indicator relates to a geometry of at least one of the first entity and the second entity.

10. The system as recited in claim 8, wherein:
    the first entity and the second entity are separate and distinct geometric features in the component design that are generated in response to execution of one or more commands corresponding to a group of feature types;
    the at least one pairing criterion relates to geometry of at least one of the first entity and the second entity; and
    the at least one pairing criterion includes at least one of a size, a location and an orientation of the first entity relative to the second entity such that the at least one of the size, the location and the orientation of the first entity changes according to the at least one pairing criterion when at least one predetermined criterion is met.

11. The system as recited in claim 10, wherein the at least one pairing criterion includes the size of the first entity relative to the second entity such that the first entity is resized relative to the second entity when the at least one predetermined criterion is met.

12. The system as recited in claim 10, wherein the at least one pairing criterion includes the orientation of the first entity relative to the second entity such that the first entity is reoriented relative to the second entity when the at least one predetermined criterion is met.

13. The system as recited in claim 5, wherein the first entity and the second entity correspond to a single part file.

14. The system as recited in claim 13, wherein the data relating to the first entity is updated in the local copy in response to a user interaction in the first multi-user computer-aided technologies (CAx) environment.

15. A system for collaborating on a component, comprising:
    at least one client multi-user computer-aided technologies (CAx) environment including a data module and a display module, the data module configured to store a local copy of data corresponding to a component design from at least one database, the display module configured to display data corresponding to the local copy;
    a host server including a processor and a memory storage device, the processor being configured to execute a host multi-user computer-aided technologies (CAx) environment having a synchronization module, the memory storage device being configured to store the at least one database accessible by the host multi-user computer-aided technologies (CAx) environment, and the synchronization module being configured to selectively cause data relating to a first entity in the component design to update in the at least one database according to at least one pairing criterion, the at least one pairing criterion relating to a second entity in the component design, and wherein the first entity and the second entity are separate and distinct geometric features in a single instance of the component design, and the at least one pairing criteria is set prior to creation of the first entity; and
    wherein the synchronization module is configured to cause the first entity to update in the at least one client multi-user computer-aided technologies (CAx) environment according to the at least one pairing criterion in response to a predetermined time threshold being met, the predetermined time threshold being an elapsed time since the data module last accessed data corresponding to the first entity in the at least one database and/or the local copy.

16. The system as recited in claim 15, wherein the at least one pairing criterion includes one or more parameters of the first entity linked to one or more parameters of the second entity.

17. The system as recited in claim 16, wherein the at least one pairing criterion includes at least one of a size, a location, and an orientation of the first entity relative to the second entity.

18. A method for collaborating on a component design, comprising the steps of:
   accessing a component design in a first multi-user computer-aided technologies (CAx) environment from at least one database;
   selecting a first entity in the component design;
   setting at least one pairing criterion relating to the first entity and relating to a second entity in the component design, including setting the at least one pairing criteria prior to creation of the first entity;
   updating the first entity in a local copy of the component design according to the at least one pairing criterion in response to one or more parameters of the second entity being set, and wherein the first entity and the second entity are separate and distinct geometric features in the local copy corresponding to a single instance of the component design, wherein at least one of the first and second entities is generated by a second multi-user computer-aided technologies (CAx) environment prior to the selecting step; and
   displaying the first entity in the first multi-user computer-aided technologies (CAx) environment according to the at least one pairing criterion in response to a predetermined time threshold being met, the predetermined time threshold being an elapsed time since the first multi-user computer-aided technologies (CAx) environment last accessed data corresponding to the first entity in the at least one database and/or the local copy.

19. The method as recited in claim 18, wherein creation of the first entity occurs prior to creation of the second entity.

20. The method as recited in claim 19, wherein the step of updating the first entity according to the at least one pairing criterion in response to one or more parameters of the second entity being set includes causing a size of the first entity to change relative to the second entity.

21. The method as recited in claim 18, wherein the step of setting the at least one pairing criterion relating to the first entity and the second entity includes selection of geometry of the first entity and selection of geometry of the second entity.

22. The method as recited in claim 18, wherein the step of updating the first entity according to the at least one pairing criterion in response to one or more parameters of the second entity being set includes causing a position of the first entity to change.

\* \* \* \* \*